(12) United States Patent
Pahlevaninezhad et al.

(10) Patent No.: US 9,257,864 B2
(45) Date of Patent: Feb. 9, 2016

(54) INPUT POWER CONTROLLER FOR AC/DC BATTERY CHARGING

(75) Inventors: Majid Pahlevaninezhad, Kingston (CA); Praveen Jain, Kingston (CA)

(73) Assignee: CISTEL TECHNOLOGY INC., Ottawa, Ontario (CA)

( * ) Notice: Subject to any disclaimer, the term of this patent is extended or adjusted under 35 U.S.C. 154(b) by 203 days.

(21) Appl. No.: 13/425,734

(22) Filed: Mar. 21, 2012

(65) Prior Publication Data

US 2013/0249469 A1 Sep. 26, 2013

(51) Int. Cl.
| | |
|---|---|
| H02J 7/00 | (2006.01) |
| H02J 7/02 | (2006.01) |
| H02M 1/10 | (2006.01) |
| H02M 1/42 | (2007.01) |

(52) U.S. Cl.
CPC ............... *H02J 7/022* (2013.01); *H02M 1/10* (2013.01); *H02M 1/4225* (2013.01); *Y02B 40/90* (2013.01); *Y02B 70/126* (2013.01)

(58) Field of Classification Search
CPC ....................................................... Y02T 90/14
USPC ........ 320/107; 180/65.21, 65.29; 363/98, 132
See application file for complete search history.

(56) References Cited

U.S. PATENT DOCUMENTS

| | | | | |
|---|---|---|---|---|
| 5,781,419 | A * | 7/1998 | Kutkut et al. | 363/17 |
| 8,614,902 | B2 * | 12/2013 | Pansier et al. | 363/89 |
| 2012/0091970 | A1 * | 4/2012 | Cho et al. | 320/160 |

OTHER PUBLICATIONS

R. Giral et al., "Interleaved Converters Operation Based on CMC", IEEE Transactions on Power Electronics, vol. 14, No. 4, 643-652, 1999.
T. Nussbaumer and J. Kolar, "Comparison of 3-Phase Wide Output Voltage Range PWM Rectifiers", IEEE Transactions on Industrial Electronics, vol. 54, No. 6, 3422-3425, 2007.
S. Lukic et al., "Energy Storage Systems for Automotive Applications", IEEE Transactions on Industrial Electronics, vol. 55, No. 6, 2258-2267, 2008.
A. Emadi et al., "Power Electronics and Motor Drives in Electric, Hybrid Electric, and Plug-In Hybrid Electric Vehicles", IEEE Transactions on Industrial Electronics, vol. 55, No. 6, 2237-2245, 2008.
T. Nussbaumer et al., "Comparative evaluation of modulation methods of a three-phase buck + boost PWM rectifier. Part II: Experimental verification", IET Power Electron., vol. 1, No. 2, 268-274, 2008.
T. Nussbaumer et al., "Design Guidelines for Interleaved Single-Phase Boost PFC Circuits", IEEE Transactions on Industrial Electronics, vol. 56, No. 7, 2559-2573, 2009.

(Continued)

*Primary Examiner* — Drew A Dunn
*Assistant Examiner* — Zixuan Zhou
(74) *Attorney, Agent, or Firm* — Brion Raffoul

(57) ABSTRACT

A control approach of adjusting the input power of a power factor correction (PFC) stage so that the output voltage (DC-link) of the input AC/DC stage to an intermediate DC voltage (DC-Bus voltage) is adjusted based on the amount of power required to charge a high energy battery is disclosed. The present invention controls the input power of the PFC instead of the DC-bus voltage as is common in conventional methods. Therefore, a very fast response compared to the conventional sluggish voltage loop can be achieved. Also, having different DC-bus voltages for different output load conditions allows the DC/DC converter to work with an optimal duty cycle for a whole range of load variations.

17 Claims, 16 Drawing Sheets

(56) References Cited

OTHER PUBLICATIONS

E. Song et al., "Experimental Validation of Nonlinear Control for a Voltage Source Converter", IEEE Transactions on Control Systems Technology, vol. 17, No. 5, 1135-1144, 2009.

Y. Lee et al., "Advanced Integrated Bidirectional AC/DC and DC/DC Converter for Plug-In Hybrid Electric Vehicles", IEEE Transactions on Vehicular Technology, vol. 58, No. 8, 3970-3980, 2009.

H. Kosai et al., "Coupled Inductor Characterization for a High Performance Interleaved Boost Converter", IEEE Transactions on Magnetics, vol. 45, No. 10, 4812-4815, 2009.

C. Gallo, "A Passive Lossless Snubber Applied to the AC-DC Interleaved Boost Converter", IEEE Transactions on Power Electronics, vol. 25, No. 3, 775-785, 2010.

* cited by examiner

INPUT POWER CONTROLLER FOR AC/DC BATTERY CHARGING

FIELD OF THE INVENTION

The present invention relates to control systems to boost PFC AC/DC converters. More specifically, the present invention relates to methods, circuits, and devices for controlling AC/DC converters. In particular, this invention relates to Electric Vehicle (EV) power conditioning systems, which utilize an AC/DC converter to charge the high voltage battery (traction battery).

BACKGROUND TO THE INVENTION

Power conversion systems in Electric Vehicles (EVs) usually utilize a high energy battery pack to store energy for the electric traction system. This high energy battery pack is typically charged by a utility for an alternating current (AC) outlet. The energy conversion during the battery charging is performed by an AC/DC (direct current) converter. Such AC/DC converters, which are used to charge the high-energy battery, usually consist of two stages: (1) an input Power Factor Correction (PFC) with AC/DC conversion stage and (2) a DC/DC converter for battery charging stage. The power factor correction (PFC) is used to improve the quality of the input current that is drawn from the utility. The PFC also improves the charger, which is the isolated DC/DC converter that charges the high voltage (HV) battery.

Boost converters are generally used to realize the input PFC and AC/DC conversion. In high power applications, interleaving PFC boost stages can reduce the inductor area required, as well as reduce the output capacitor ripple current.

Conventionally, the PFC AC/DC input stage converts the AC input voltage to a fixed intermediate DC-bus voltage and then the DC/DC isolated converter is controlled according to a charging profile of the battery for the charging process. Therefore, the PFC AC/DC input converter operates independent of the charging profile of the battery. It just regulates the intermediate DC-bus voltage to a fixed value and shapes the input current of the converter. Thus the input voltage of the full-bridge converter (DC-bus) is fixed (with a second harmonic ripple). Since the input DC-bus voltage of the DC/DC converter is fixed, it operates with maximum duty-ratio at the maximum load and with very small duty-ratios at light loads. Given that the converter generally operates under full-load for a small period of time and under light loads or zero load (when battery is charged) for a longer period of time, the converter mostly operates with small duty-ratios. However, at small duty-ratios, to maintain zero voltage switching (ZVS), the amount of reactive current should be increased, but that in turn leads to higher conduction losses.

Another major drawback of the conventional AC/DC converters is the control method and system. In the conventional control technique, there is an external voltage loop to regulate the DC-bus voltage and an internal current loop to shape the input current of the converter. The voltage loop has a very low bandwidth so as not to affect the input power factor through modulation as a result of the second harmonic ripple present in the DC-bus capacitor. Typically, the cut-off frequency of such a voltage control loop is only as low as 10 Hz in order to remove the second harmonic ripple at the DC-bus voltage. Otherwise, the second harmonic would modulate the control signal at the controller output, giving rise to a third harmonic distortion of the input current. In addition, such a low bandwidth voltage control loop gives rise to a very sluggish transient response or high overshoots and undershoots in the DC-bus voltage during load transients. This causes unwanted over designing of downstream converters, which affects their efficiency and overall cost.

A boost PFC AC/DC converter is a highly nonlinear system with a large range of operation. Thus, linear PI regulators are not able to optimally perform for the whole operating range. In addition, there is another main challenge in the voltage control loop of the converter due to the presence of second harmonic ripple at the output voltage (DC-link). The voltage loop controller should be of very low bandwidth in order to remove the low frequency second harmonic ripple. Therefore, the transient response of the converter is very poor and the system usually has marginal stability against severe load changes.

The existing methods either use very high order digital comb filtering to remove the second harmonic present at the DC-link voltage or they use coarse sampling to remove the low frequency ripple.

Precise tuning of the comb filter and synchronizing of the coarse sampler are usually challenging and offset the advantages of the existing techniques. In addition, complicated digital algorithms reduce the reliability of the converter.

From the above discussion, it can be concluded that the necessity of filtering the second harmonic ripple is the prime cause of sluggish response of a conventional control methods for a PFC AC/DC boost converter.

In light of the aforementioned shortcomings of the prior art, the present invention seeks to provide an effective solution to the problems related to the conventional control systems of boost PFC AC/DC converters.

SUMMARY OF INVENTION

The present invention provides an input power controller for an AC/DC battery charger. The present invention directly controls the input power of a converter instead of the DC-link voltage based on the power demand from the charging curve of the battery. The controller optimally controls the boost PFC converter throughout its whole range of operation. The DC-link voltage in turn changes based on the power demand of the battery. Therefore, the downstream converter can operate with optimal duty ratio compared to the fixed DC-link voltage.

AC/DC converters used for charging the high voltage battery bank in electric vehicles from the utility mains, generally, consist of two stages: (1) a power factor correction (PFC) AC/DC boost converter to reduce the input current harmonics injected to the grid and convert the input AC voltage to an intermediate DC voltage (DC-Bus voltage), and (2) an isolated DC/DC converter for providing high frequency galvanic isolation. A control approach of adjusting the input power of the PFC stage so that the output voltage (DC-link) of the input AC/DC stage is adjusted based on the amount of power required to charge the high energy battery, is described herein. The present invention controls the input power of the PFC instead of the DC-bus voltage. Therefore, a very fast response compared to the conventional sluggish voltage loop can be achieved. Also, having different DC-bus voltages for different output load conditions allows the DC/DC converter to work with an optimal duty cycle for a whole range of load variations. This results in better overall efficiency and superior performance over conventional systems.

In a first aspect, the present invention provides a system for charging a battery comprising: a full bridge diode rectifier receiving an AC input; a full bridge converter; and a pair of interleaved boost converters operatively coupled in parallel between the full bridge converter and the full bridge diode rectifier; wherein the pair of interleaved boost converters and the full bridge converter are operated according to a charging profile of the battery.

In a second aspect, the present invention provides an alternating current/direct current (AC/DC) converter for charging a battery comprising: a full bridge diode rectifier receiving an AC input; a full bridge converter; and a pair of interleaved boost converters operatively coupled in parallel between the full bridge converter and the full bridge diode rectifier; wherein the pair of interleaved boost converters and the full bridge converter are operated according to a charging profile of the battery.

BRIEF DESCRIPTION OF THE DRAWINGS

The embodiments of the present invention will now be described by reference to the following figures, in which identical reference numerals in different figures indicate identical elements and in which.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, or that the two or more elements co-operate or interact with each other (e.g. as in a cause and effect relationship).

The present invention provides a controller that regulates the input power of a PFC converter, instead of the DC-bus voltage. The controller mainly adjusts the amplitude of the input current reference and hence the DC-bus voltage, based on the power demand.

Nonlinear controllers can optimize the performance of the PFC converter for a wide range of operating conditions. The flatness theory is an effective nonlinear approach to designing the controller for nonlinear systems. The flatness is a measure of the nonlinearity of the system. When a system is flat, it means that the nonlinear behaviour of the system is well characterized. Thus, taking advantage of the flat structure of the system, a controller design for trajectory generation and stabilization is achieved.

The PFC system of the present invention is flat with respect to the input power; hence, the system may be transformed to a trivial system by utilizing the flatness theory. As such, the control law of the present invention is designed based on a Control-Lyapunov-Function (CLF) using the transformed system in the flat coordinates.

Figure 1:
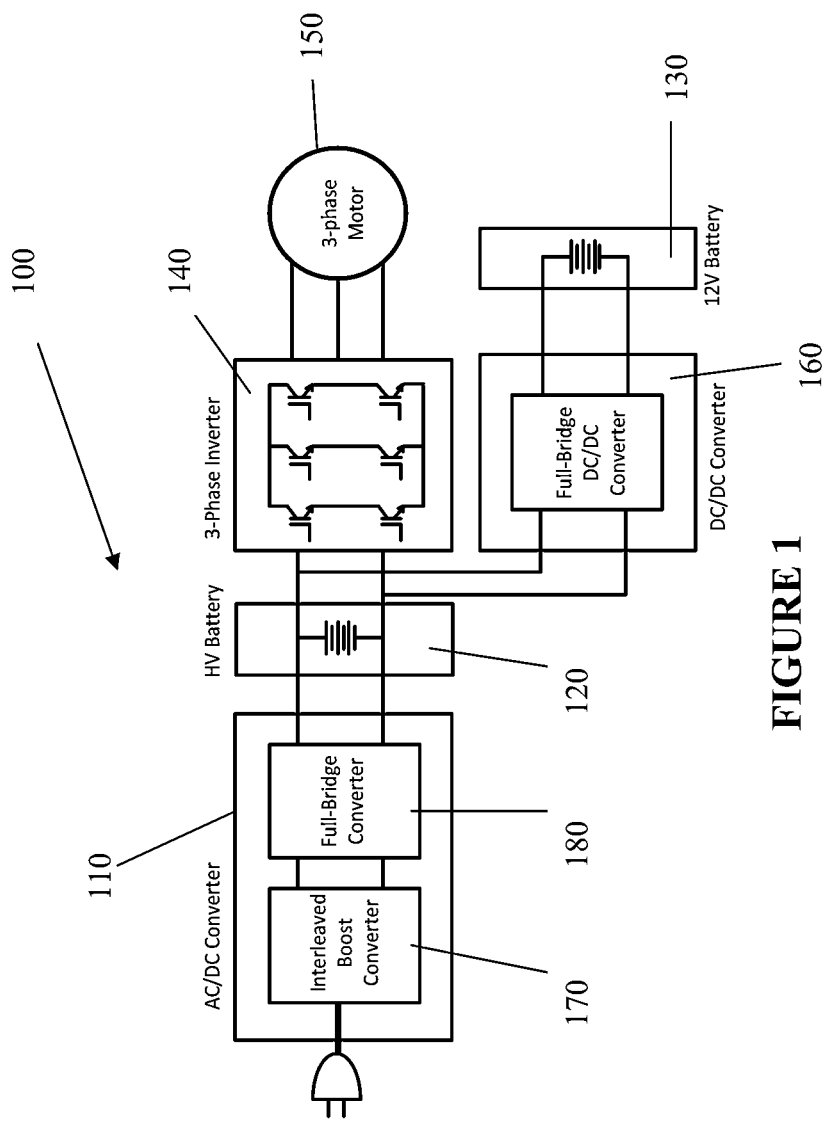
FIG. 1 is a diagram showing an EV power conversion system with an AC/DC converter in accordance with an aspect of the present invention.

Referring now to the Drawings, FIG. 1 is a diagram showing an electric vehicle (EV) power conversion system 100 with an AC/DC converter 110 according to the present invention. In this system 100, there are two sets of batteries: a high voltage (HV) battery 120 and a 12 volt (V) battery 130. The power conversion system 100 also consists of a three-phase DC/AC inverter 140, a three-phase motor 150, and a full-bridge DC/DC converter 160. The AC/DC converter 110 is operatively coupled to the HV battery 120. The HV battery 120 is operatively coupled to the three-phase inverter 140 and the full-bridge DC/DC converter 160. The three-phase inverter 140 is operatively coupled to the three-phase motor 150. The full-bridge DC/DC converter 160 is operatively coupled to the 12 V battery 130.

The AC/DC converter 110 is a plug-in converter that charges the HV battery 120. The HV battery 120 then feeds the three-phase DC/AC inverter 140. The HV battery 120 supplies power to the three-phase DC/AC inverter 140, which in turn feeds the three-phase motor 150. The HV battery 120 is also charging the 12V battery 130 through the full-bridge DC/DC converter 160.

The present invention provides a novel AC/DC converter 110 that charges the HV battery. As shown in FIG. 1, the AC/DC converter 110 consists of two interleaved boost converters 170 and a full-bridge converter 180. The interleaved boost converters 170 are utilized to implement an input PFC and an AC/DC conversion.

Figure 2:
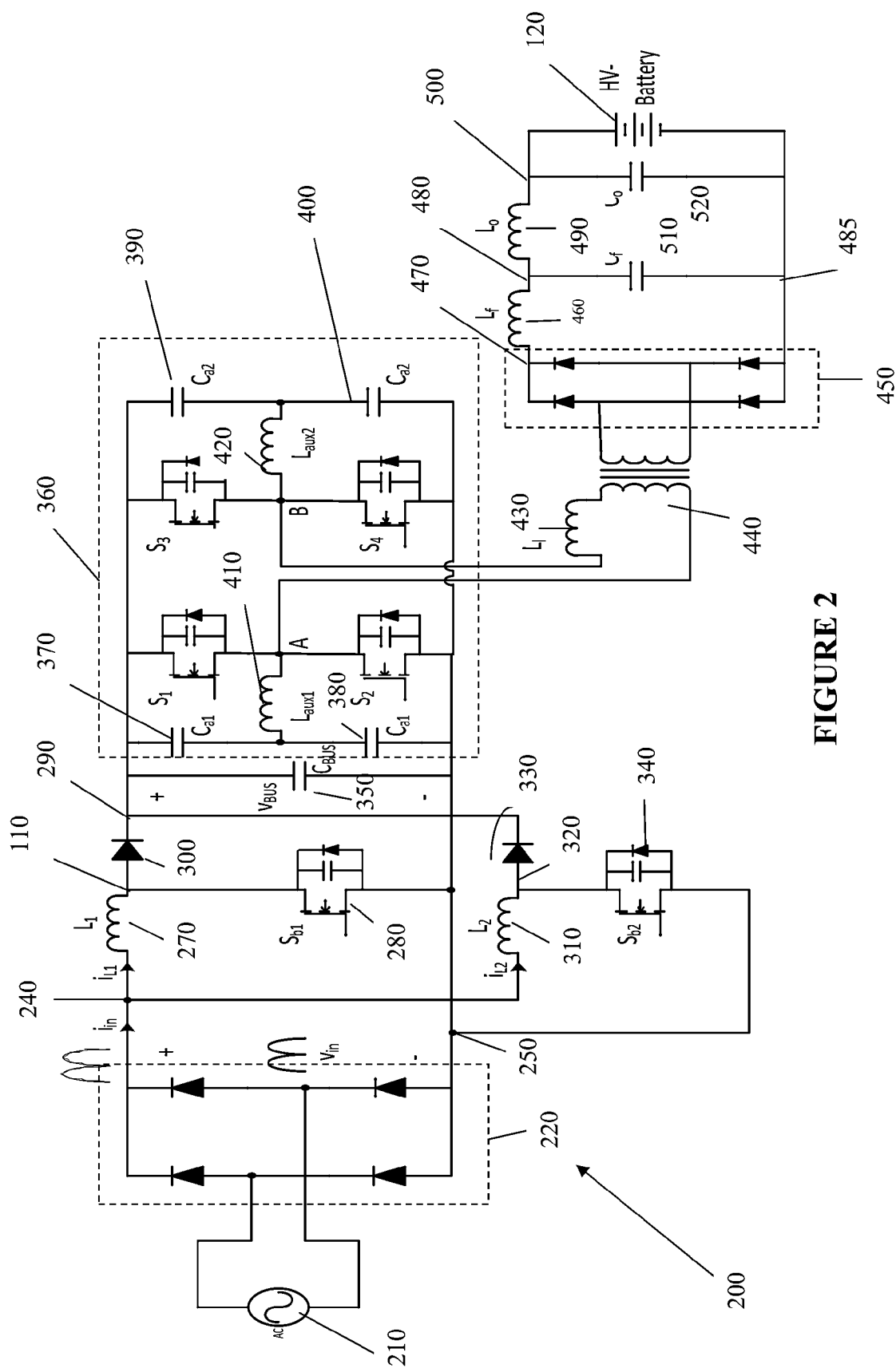
FIG. 2 is a power circuit of the AC/DC converter in accordance with an aspect of the present invention.

FIG. 2 shows a power circuit 200 of the AC/DC converter 110 in accordance with an aspect of the present invention. As shown in FIG. 1, the AC/DC converter 110 consists of a PFC stage and a full-bridge DC/DC converter stage. The circuit 200 has an input signal from an AC current source 210. This signal is received by a first full bridge diode rectifier 220 which is coupled between a positive input node 240 and a negative power node 250. Coupled between the positive input node 240 and a first intermediate node 260 is a first inductor 270. Coupled between the first intermediate node 260 and the negative power node 250 is a first power transistor 280. In a MOSFET implementation of the first power transistor 280, the drain lead is coupled to the first intermediate node 260 and the source lead is coupled to the negative power node 250. Coupled between the first intermediate node 260 and a positive output node 290 is a first diode 300. The first power transistor 280, the first inductor 270 and the first diode 300 form a first boost converter.

Connected in parallel to the first boost converter is a second boost converter that can be described as follows. A second inductor 310 is coupled between the positive input node 240 and a second intermediate node 320. A second diode 330 is coupled between the second intermediate node 320 and the first positive output node 290. A second power transistor 340 is coupled between the second intermediate node 320 and the negative power node 250. The second inductor 310, the second diode 330, and the second power transistor 340 form the second boost converter.

Referring again to FIG. 2, a bus voltage forms across a bus capacitor 350 coupled between the positive output node 290 and the negative node 250. Next, a full bridge converter 360 is coupled between the between the positive output node 290 and the negative node 250. The full bridge converter 360 includes a bridge formation of four power transistors S1, S2, S3, and S4, operatively coupled to four capacitors 370, 380, 390, 400, a third inductor 410 coupled between the two converter capacitors 370 and 380 and node A, and a fourth inductor 420 coupled between the two other converter capacitors 390 and 400 and node B. A fifth inductor 430 and a transformer 440 are operatively coupled between nodes A and B. Nodes A and B can be seen as the output nodes of the full bridge converter. A first leg of the full bridge converter has the transistors S1 and S2 with capacitors 370, 380 and inductor 410 while a second leg has transistors S3 and S4 with capacitors 390, 400 and inductor 420.

Each leg of the full bridge converter has a first power transistor, a second power transistor, a first capacitor and a second capacitor and an inductor. The first capacitor and the second capacitor are in series, and a first terminal of the inductor is coupled between the first capacitor and the second capacitor and a second terminal of the inductor is coupled to an output node.

In FIG. 2, the transformer 440 is operatively coupled to a second full bridge diode rectifier 450. A sixth inductor 460 is coupled between a second positive input node 470 and a third intermediate node 480. A seventh inductor 490 is coupled between the third intermediate node 480 and a second positive output node 500. A further capacitor is coupled between the third intermediate node 480 and a second negative power node 485. An output capacitor 520 is coupled between the second positive output node 500 and the second negative power node 485. An HV battery 120 is also coupled in parallel to the output capacitor 520.

Figure 3:
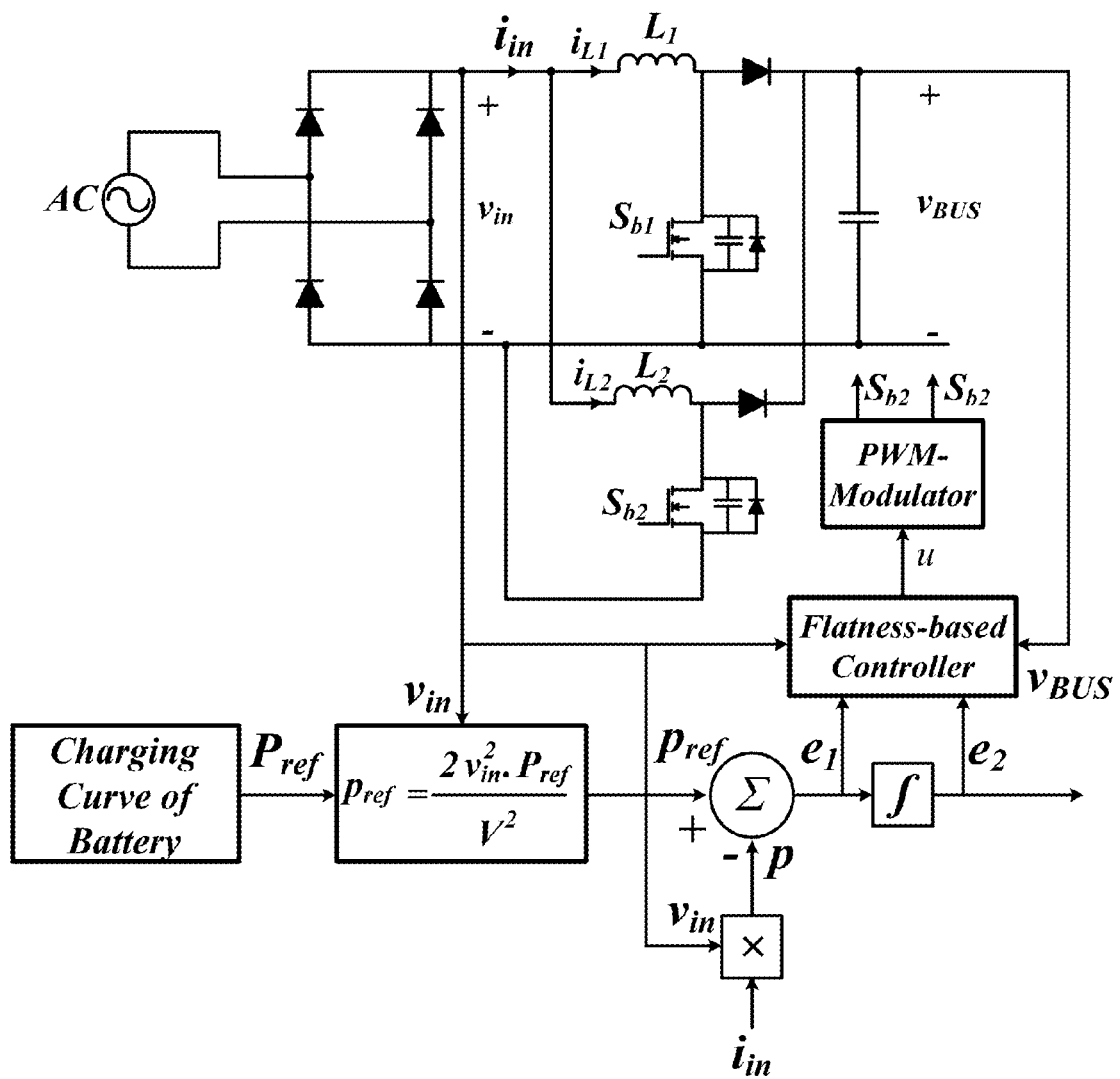
FIG. 3 is a block diagram of a controller in accordance with an aspect of the present invention.

FIG. 3 is a diagram of the control system 600 according to an aspect of the present invention. According to FIG. 3, the reference value of the average power $P_{ref}$ is calculated based on a charging curve 610 of the HV battery 120 shown in FIG. 2 and its battery voltage $V_{BAT}$. The bus voltage $V_{BUS}$ is measured and fed back for processing according to the control law as shown in FIG. 3. The control system 600 includes the charging curve 610 which shows the charging profile of the HV battery 120 as a function of power (P) and voltage (V). The average power $P_{ref}$ for a particular $V_{BAT}$ is continuously output as $P_{ref}$ to functional block 620 to determine the flat output $y_d$ according to Equation 6 detailed below. The flat output $y_d$ is summed at functional block 630 with the instantaneous output power y determined at functional block 640 based on Equations 5 and 6 detailed below and the input voltage $v_{in}$ and input current $i_{in}$ as output at the full bridge diode rectifier 220. Tracking variables e1 and e2, which are calculated according to Equations 12 and 13 detailed below, are derived at functional block 650 based on Equations 14 and 15 defined below. An output from functional block 650 is sent to a functional block 660 for calculations according to the control law at functional block 660 defined by Equations 16 and 17.

Figure 4:
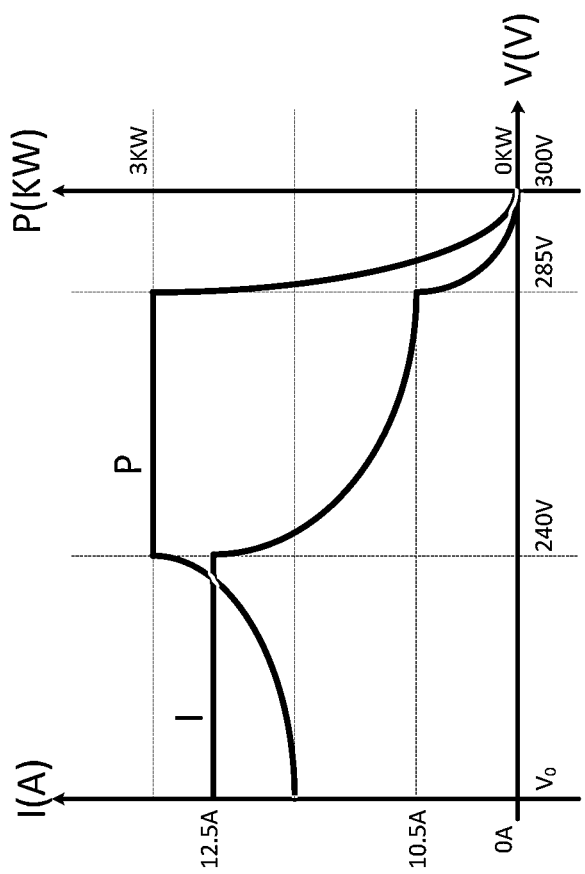
FIG. 4 is a graphical representation of a charging curve of the battery in accordance with an aspect of the present invention.

FIG. 4 shows a typical charging curve of the HV battery. The reference value of the instantaneous power is calculated from the reference value of the average power.

Figure 5:
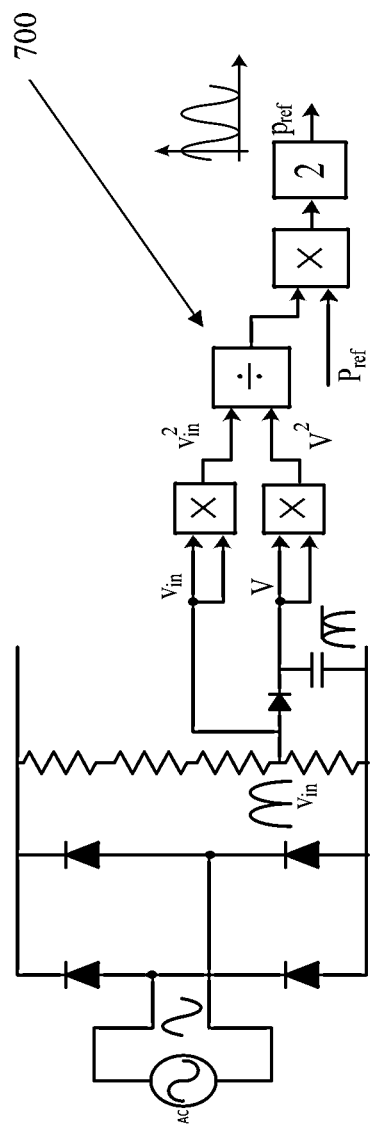
FIG. 5 is a schematic of a power reference generator in accordance with an aspect of the present invention.

FIG. 5 shows how to calculate the instantaneous power from the average power. In this block diagram, there is shown a peak detector circuit 700 to measure the peak value of the rectified input voltage. The reference value of the instantaneous input power is given by:

$$p_{ref}(t) = \frac{2v_{in}^2 \cdot P_{ref}}{V^2} \quad \text{Equation 1}$$

where V is the amplitude of the input ac voltage and the instantaneous input voltage is given by:

$$v_{in} = |V \cdot \sin(\omega \cdot t)| \quad \text{Equation 2}$$

The state equations of the interleaved boost converter are given by:

$$\frac{di_{L1}}{dt} = \frac{1}{L} \cdot v_{in} - \frac{R_L}{L} \cdot i_{L1} - \frac{1}{L} \cdot (1-d) \cdot v_{BUS} \quad \text{Equation 3}$$

$$\frac{di_{L2}}{dt} = \frac{1}{L} \cdot v_{in} - \frac{R_L}{L} \cdot i_{L2} - \frac{1}{L} \cdot (1-d) \cdot v_{BUS} \quad \text{Equation 4}$$

The instantaneous input power of the interleaved boost converter with input PFC is given by:

$$p_{in} = v_{in} \cdot i_{in} \quad \text{Equation 5}$$

The flat output is defined as the instantaneous input power:

$$y = h(x,u) = v_{in} \cdot i_{in} \quad \text{Equation 6}$$

The system state-variable and the control input are given by:

$$x = i_{jn} \quad \text{Equation 7}$$

$$u = d \quad \text{Equation 8}$$

In order to show that the system is flat, the state variable and the control are determined as functions of the flat output. The state variable is determined as a function of the flat output as follows:

$$x = \varphi(y) = \frac{y}{v_{in}} \quad \text{Equation 9}$$

In order to derive the control input as a function of the flat output, the derivative of the flat output is calculated as:

$$\frac{dy}{dt} = x \cdot \dot{v}_{in} + v_{in} \cdot \dot{x} = \qquad \text{Equation 10}$$

$$\frac{\dot{v}_{in}}{v_{in}} \cdot y + v_{in} \cdot \left[ \frac{2v_{in}}{L} - \frac{R_L}{L \cdot v_{in}} \cdot y - \frac{2v_{BUS}}{L}(1-u) \right]$$

The control input is derived from Equation 10 as:

$$u = \xi(y, \dot{y}) = \qquad \text{Equation 11}$$

$$1 + \frac{L}{2v_{BUS} \cdot v_{in}} \cdot \dot{y} - \left( \frac{L \cdot \dot{v}_{in}}{2v_{in}^2 \cdot v_{BUS}} - \frac{R_L}{2v_{BUS} \cdot v_{in}} \right) \cdot y - \frac{v_{in}}{v_{BUS}}$$

Because u is a function of the flat output and its derivative, the system is flat and it can be transformed to a trivial system through an endogenous feedback.

In order to take into account the input disturbance, any model errors, and any system uncertainties, an integral of the flat output is augmented to the system. This integral term effectively compensates the system uncertainties such as the uncertainties in $R_L$ and $L$, etc. Therefore, the tracking variables are defined as:

$$e_1 = \int_0^t (y_d(\tau) - y(\tau)) d\tau \qquad \text{Equation 12}$$

$$e_2 = y_d - y \qquad \text{Equation 13}$$

In order to derive the control law for the system, the following control-Lyapunov function is defined:

$$V(e_1, e_2) = \frac{1}{2} e_1^2 + \frac{1}{2} e_2^2 \qquad \text{Equation 14}$$

The derivative of Equation 14 is given by:

$$\dot{V}(e_1, e_2) = \qquad \text{Equation 15}$$

$$e_1 \cdot \dot{e}_1 + e_2 \cdot \dot{e}_2 = e_1 \cdot e_2 + e_2 \cdot \left[ \left( \frac{\dot{v}_{in}}{v_{in}} - \frac{R_L}{L} \right) \cdot y + \frac{2v_{in}^2}{L} - \frac{2}{L} \cdot v_{in} \cdot v_{BUS} + \frac{2}{L} \cdot v_{in} \cdot v_{BUS} \cdot u \right]$$

Therefore, the control law is defined as:

$$u = \frac{L}{2v_{BUS} \cdot v_{in}} \cdot \qquad \text{Equation 16}$$

$$\left[ \dot{y}_d - \left( \frac{\dot{v}_{in}}{2v_{in}} - \frac{R_L}{L} \right) \cdot y - \frac{2v_{in}^2}{L} + \frac{2}{L} \cdot v_{in} \cdot v_{BUS} + k_1 \cdot e_2 + e_1 \right]$$

By using Equation 16 the derivative of the Lyapunov function, is given by:

$$\dot{V} = -k_1 \cdot e_2^2 \qquad \text{Equation 17}$$

The stability of a nonlinear system can be analyzed based on the Lyapunov stability theory. This theory states that if one can find a positive-definite function such that its derivative is negative-definite, the system is asymptotically stable in the sense of Lyapunov. According to Equation 14, the Lyapunov function is positive-definite. However, the derivative of the Lyapunov function is not negative-definite. It is only Negative Semi-Definite (NSD). In this case, the asymptotical stability is not guaranteed by the Lyapunov theory. Also, since the system dynamics are not autonomous, the invariant set theorem cannot be applied to prove the asymptotical stability. Therefore, the stability of the system is analyzed through Barbalat's Lemma, which analyzes the stability of non-autonomous systems. Barbalat's Lemma states that if V(x,t) satisfies the following conditions:

(a) V(x,t) has a lower bound.
(b) $\dot{V}$(x,t) is negative semi-definite (NSD)
(c) $\dot{V}$(x,t) is uniformly continuous in time ($\ddot{V}$ is bounded)

Then:

$$\dot{V}(x,t) \to 0$$

$$as\ t \to \infty \qquad \text{Equation 18}$$

According to Equation 14, the Lyapunov function has a lower bound and according to Equation 17, the derivative of the Lyapunov function is NSD. This means that V(0)≥V(t). From Equation 17, we have:

$$\int_0^t \dot{V}(e_1, e_2, \tau) d\tau = V(t) - V(0) \qquad \text{Equation 19}$$

$$\int_0^t e_2^2 d\tau = \frac{1}{k_1}[V(0) - V(t)] \qquad \text{Equation 20}$$

Therefore, $$\lim_{t \to \infty} \int_0^t e_2^2 d\tau \qquad \text{Equation 21}$$

exists and is finite, hence $e_2$ is bounded. It is only required to show that the third condition is satisfied. In order to show that $\dot{V}$(x,t) is uniformly continuous, $\ddot{V}$ is calculated from Equation 17 as follows:

$$\ddot{V}(e_1, e_2) = -2k_1 \cdot e_2 \cdot \dot{e}_2 \qquad \text{Equation 22}$$

From Equation 21, $e_2$ is bounded, and $\dot{e}_2$ is given by:

$$\dot{e}_2 = \ddot{y}_d - \dot{y} \qquad \text{Equation 23}$$

where $\dot{y}$ is given by:

$$\dot{y} = \dot{v}_{in} i_{in} + v_{in} \dot{i}_{in} \qquad \text{Equation 24}$$

It is evident from Equation 1 that $\ddot{y}_d$ is bounded and from state space Equations 3 and 4, $\dot{y}$ is also bounded, which implies that $\dot{e}_2$ is also bounded. Therefore, it can be concluded that Equation 22 is bounded, hence, $\dot{V}$(x,t) is uniformly continuous. Therefore, according to the Barbalat's Lemma:

$$\dot{V}(x,t) = -k_1 \cdot e_2^2 \to 0$$

$$as\ t \to \infty \qquad \text{Equation 25}$$

which proves the asymptotical stability of the new PFC AC/DC boost converter operated by the proposed control law.

Figure 6A:
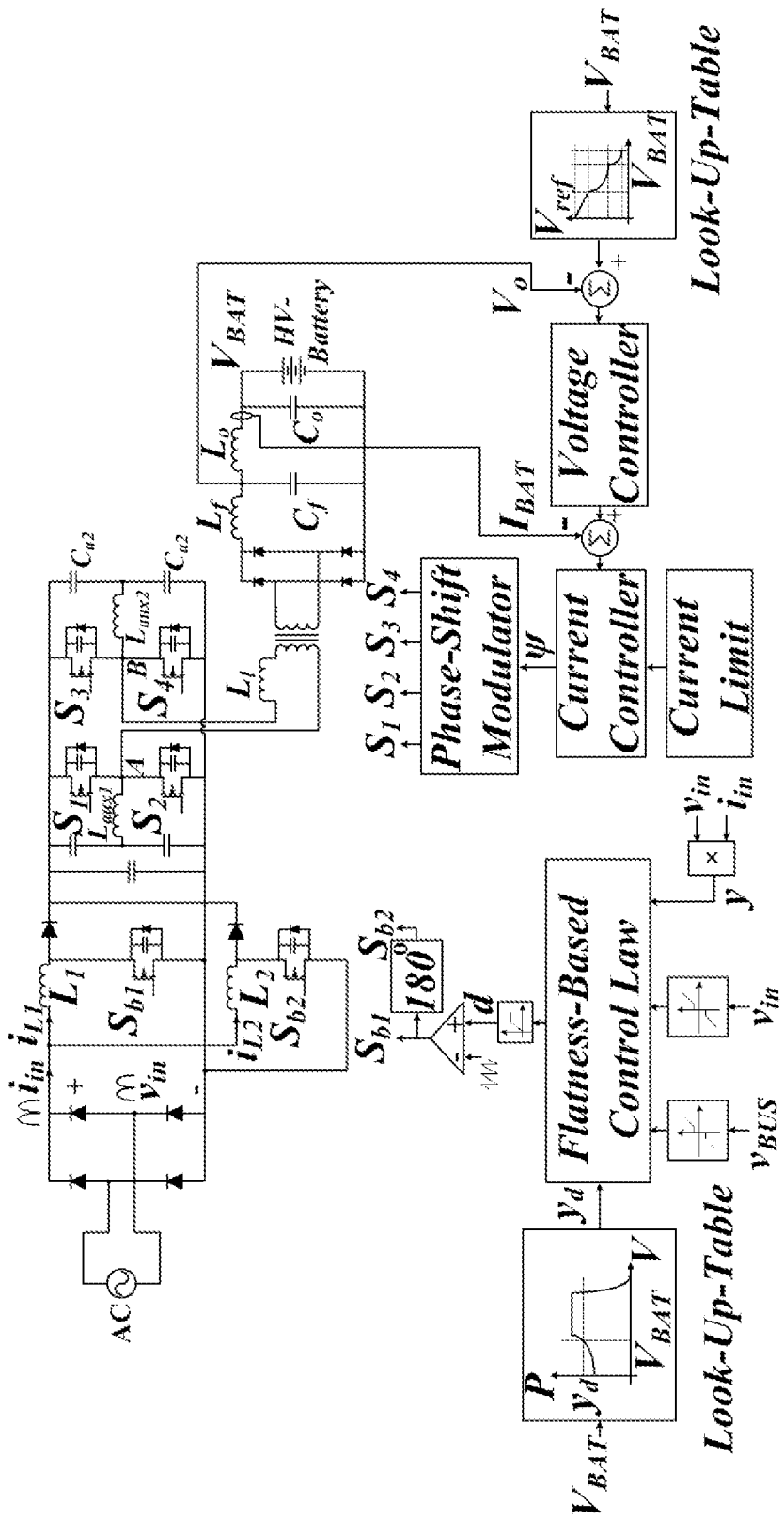
FIG. 6A is a block diagram of the control system in accordance with an aspect of the present invention.
Figure 6B:
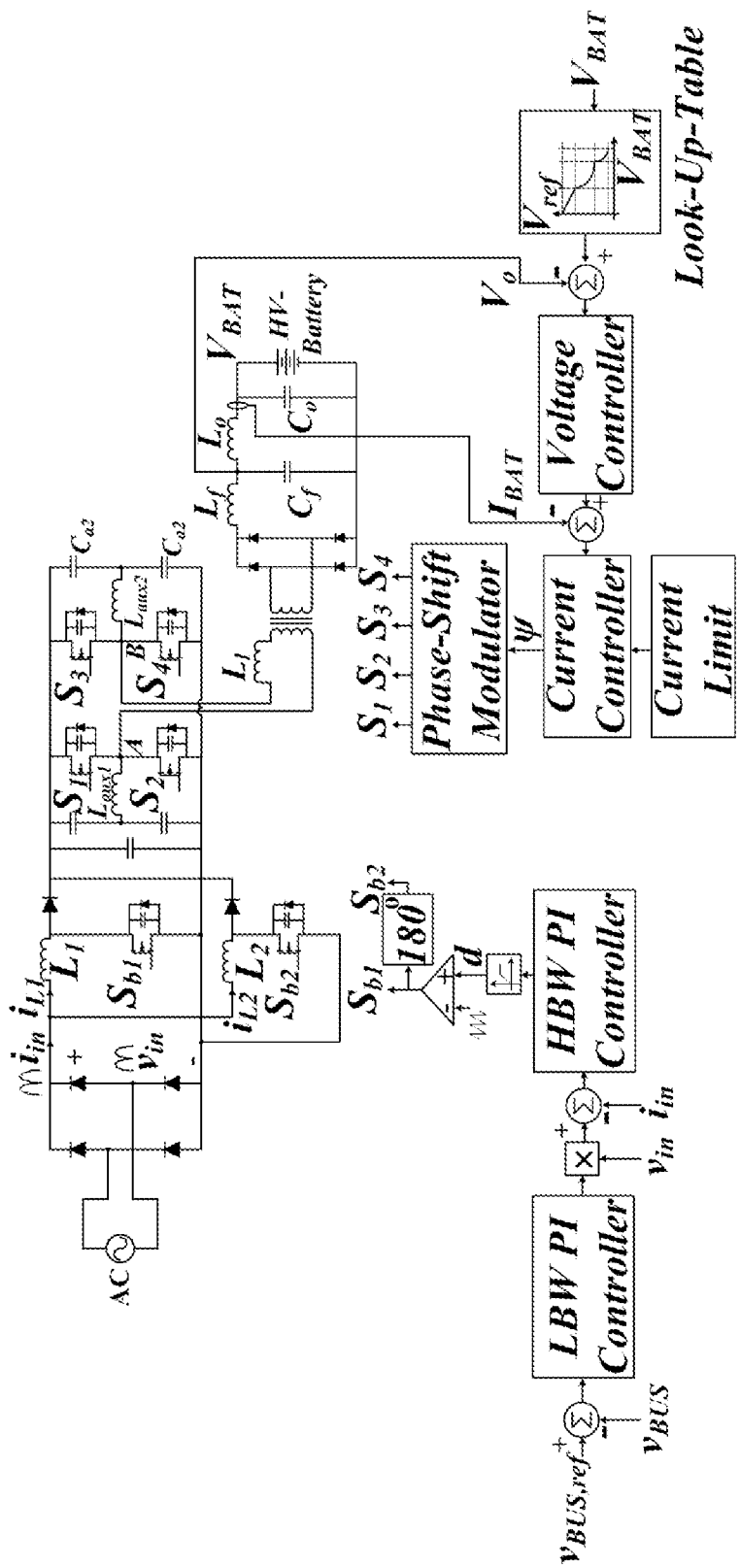
FIG. 6B is a block diagram of a conventional control system.

FIGS. 6A and 6B show the block diagrams of the control system 720 and the conventional control system 740 respectively. In the conventional control system 740 for AC/DC PFC boost converter, there are two independent control systems for the interleaved boost PFC converter and for the full-bridge DC/DC converter. The PFC controller usually consists of an external voltage loop, which regulates the DC-bus voltage and an internal current loop, which shapes the input current of the converter. The external voltage loop is a very low bandwidth compensator and has a dc reference voltage. However, the current loop is a fast controller, which has 120 Hz reference and is designed so as to track the 120 Hz rectified input voltage waveform. The voltage compensator, basically, determines the amplitude of the 120 Hz reference waveform for the current loop.

In the controller of the present invention 720 at FIG. 6A, the amplitude of the 120 Hz reference waveform is determined by the instantaneous power reference generator, which is an integral part of the proposed controller instead of the sluggish external voltage loop. By minimizing the Lyapunov function, given in Equation 14, the nonlinear controller adjusts the instantaneous duty ratio, given by Equation 16, which ensures that the input power tracks the reference value for instantaneous power. Input power waveform actually determines the shape of the input current as well as its amplitude.

Specifically in FIG. 6A, the functional block 730 differs from the functional block 750 shown at FIG. 6B. Much of the functional block 730 was explained with reference to FIG. 3. However, it should be noted that inputs Sb1 and Sb2 to the first power transistor 280 and the second transistor 340, respectively, are operated at a 180° phase difference.

It should be noted here that any kind of power switch can be used in place of the MOSFETs shown in the Drawings. However, for this application and in this power range, MOSFETs are commonly by the skilled artisan.

The other well-known problem with the boost PFC topology, in the control point of view, is the non-minimum phase zero that naturally present in the converter transfer function. If the load current increases, the duty ratio is increased temporarily to make the inductor current rise. This causes the diode conduction time to decrease, until the slowly rising inductor current changes to the new operating point. In other words, the diode current decreases before it can finally increase. This phenomenon is the effect of the right-half plane zero present in the boost-based topologies. This non-minimum phase zero has a rising gain characteristic, but with a 90° phase-lag. This combination is almost impossible to compensate with linear controllers, especially as this non-minimum phase zero varies with the load current. However, the nonlinear controller of the present invention is able to effectively remove the effects of the non-minimum phase zero present in the boost PFC converter.

One of advantages of the controller of the present invention compared to the conventional controllers is that in conventional systems the full-bridge DC/DC converter is operating according to the charging profile of the battery and the boost PFC converter is operating independent of the charging profile. However, in the present invention, both stages adaptively operate corresponding to the charging profile of the battery and the required amount of power. The battery charging profile can easily be incorporated in the form of a look-up-table in the DSP, as shown in FIG. 6A, used to implement the control system. In addition, at light loads, the boost switches are switched on and off under lower voltage owing to the reduction in the DC-bus voltage with decreasing output power.

A 3 KW prototype is implemented to verify the performance of the present invention. The designed parameters are shown in Table I.

TABLE I

CONVERTER SPECIFICATIONS

| Symbol | Parameter | Value |
|---|---|---|
| Po | Output Power | 3 KW |
| Vac | Input Voltage | 170-267 VAC |
| Vo | Output Voltage | 300 VDC |
| $f_{sb}$ | Interleaved boost switching frequency | 50 KHz |
| $f_{sf}$ | Full-Bridge Switching Frequency | 210-300 KHz |
| $I_{in\,(max)}$ | Maximum input current | 22A |
| $I_{inrush}$ | Maximum inrush current | 35A |
| P.F. | Power Factor | >98% |

Figure 7:
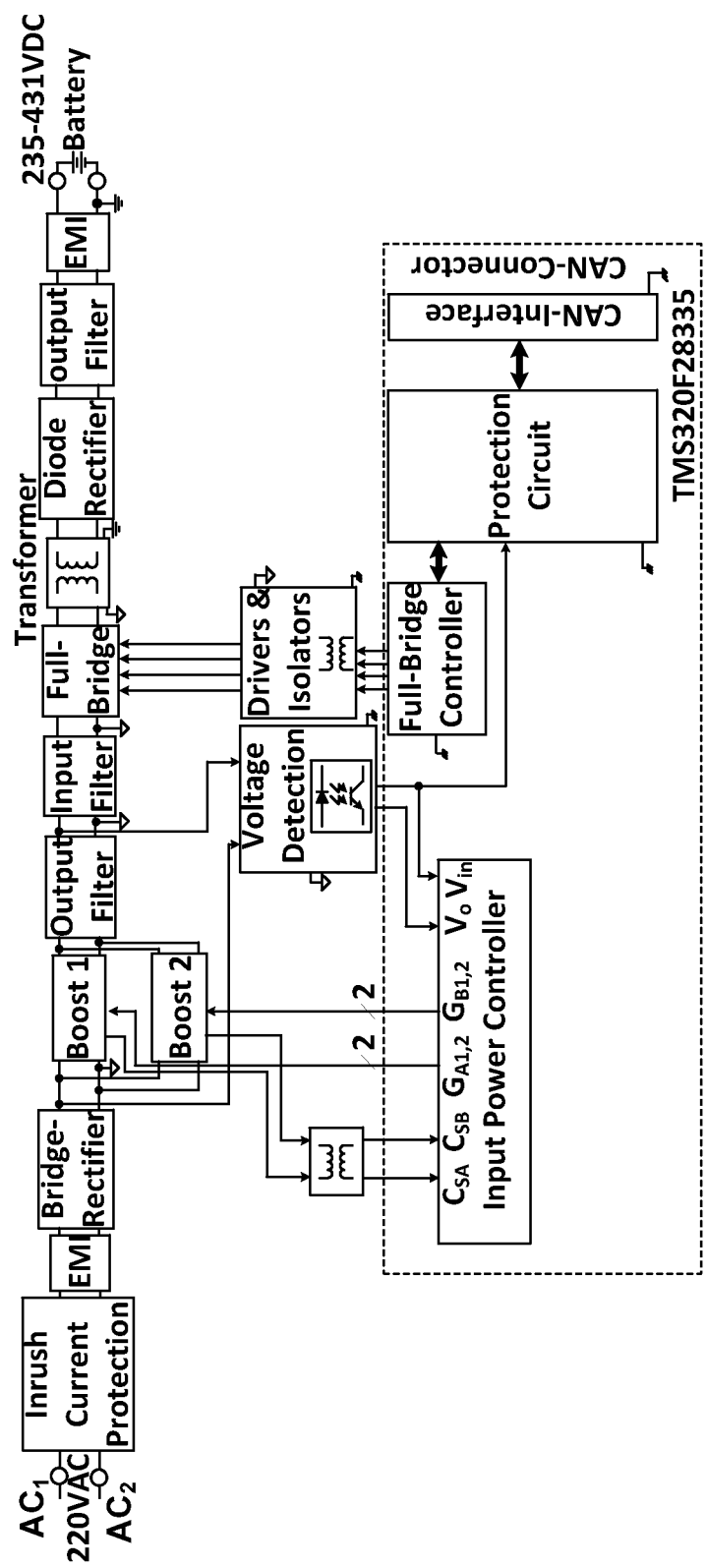
FIG. 7 is a block diagram of a converter in accordance with an aspect of the present invention.

FIG. 7 is a block diagram 900 of the converter. At the input stage, there is inrush current protection, which limits the inrush current of the converter. Since there is usually a large capacitor at the output of the PFC, the inrush current to charge the capacitor is very high and a circuit is required to limit this current. The next block is the EMI filter which is designed to comply with the EMI standard (i.e., CISPR25/12) for electric vehicles. The next block is the input diode rectifier. It rectifies the input voltage for the two-phase interleaved boost converter. The interleaved boost converts the rectified input voltage to the intermediate DC-bus voltage. The output capacitor of the interleaved boost converter is large in order to decrease the 2nd harmonic voltage ripple caused by the power ripple of the input boost PFC converter. In addition, there is a differential-Mode (DM) filter at the output of the PFC in order to filter out the differential-mode noise. At the output of this filter, a clean DC-bus voltage is provided to the full-bridge converter. It should be noted that another EMI filter is required at the output of the full-bridge converter in order to provide filtering for the EMI noise injected by the inverter. Since the inverter is connected to the high energy battery, it injects switching noise to the battery charger.

Referring again to FIG. 7, and in this particular embodiment, a microcontroller 910 was utilized to function as the input power controller, the full-bridge controller, the protection circuit and the controller area network (CAN) interface. The microcontroller utilized is the TMS320F28335 made by Texas Instruments™. Other microcontrollers and signal processing means as are known to the skilled artisan are contemplated by the present invention.

To show the performance of the present invention over conventional methods, the experimental results are given for two prototypes: one based from the present invention and one with a conventional controller.

Figure 8A:
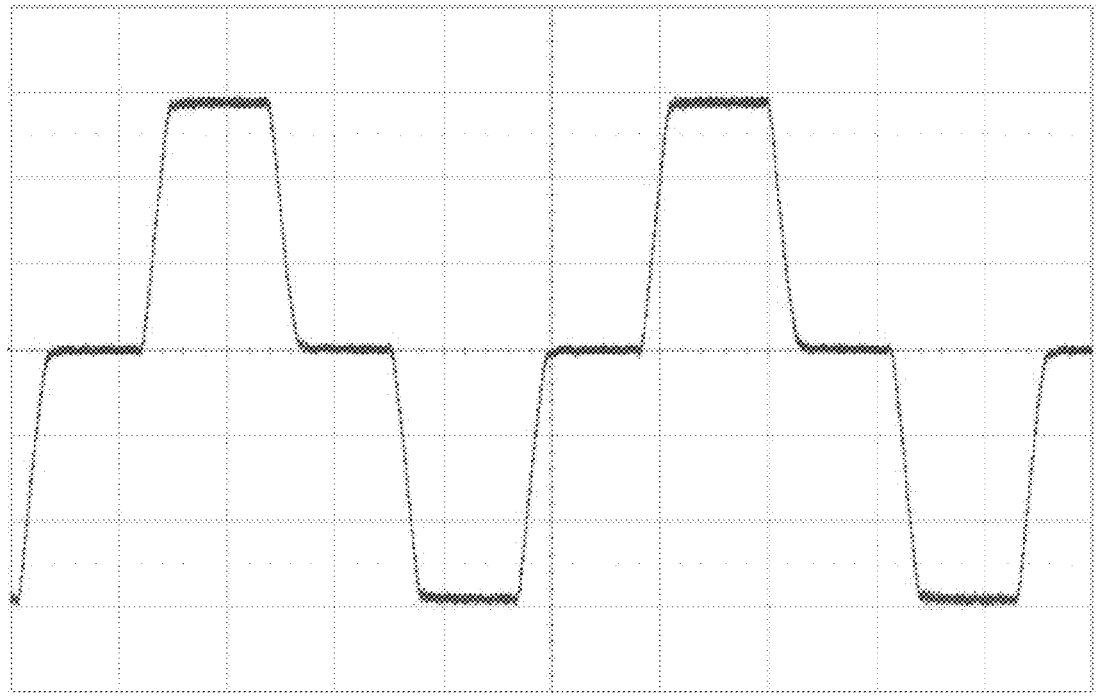
FIG. 8A and FIG. 8B are graphical representations showing the full-bridge output voltage at no-load for the proposed and conventional control method respectively.
Figure 8B:
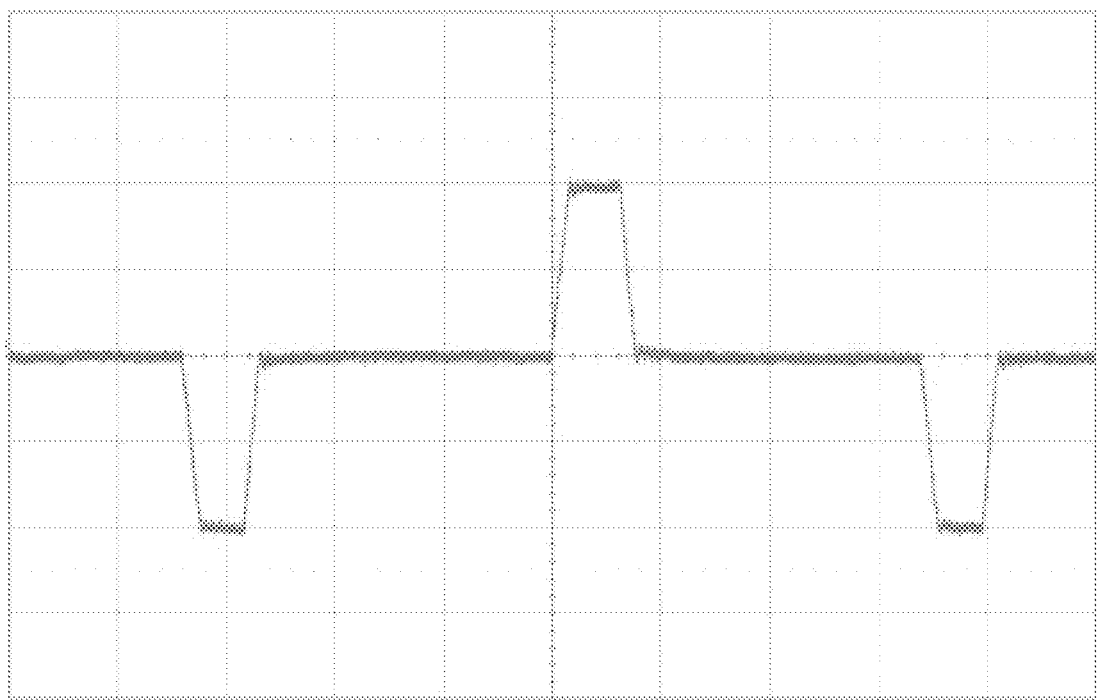

FIGS. 8A and 8B show the output voltage of the full-bridge inverter for no-load for the present invention and the conventional approach respectively.

Figure 9A:
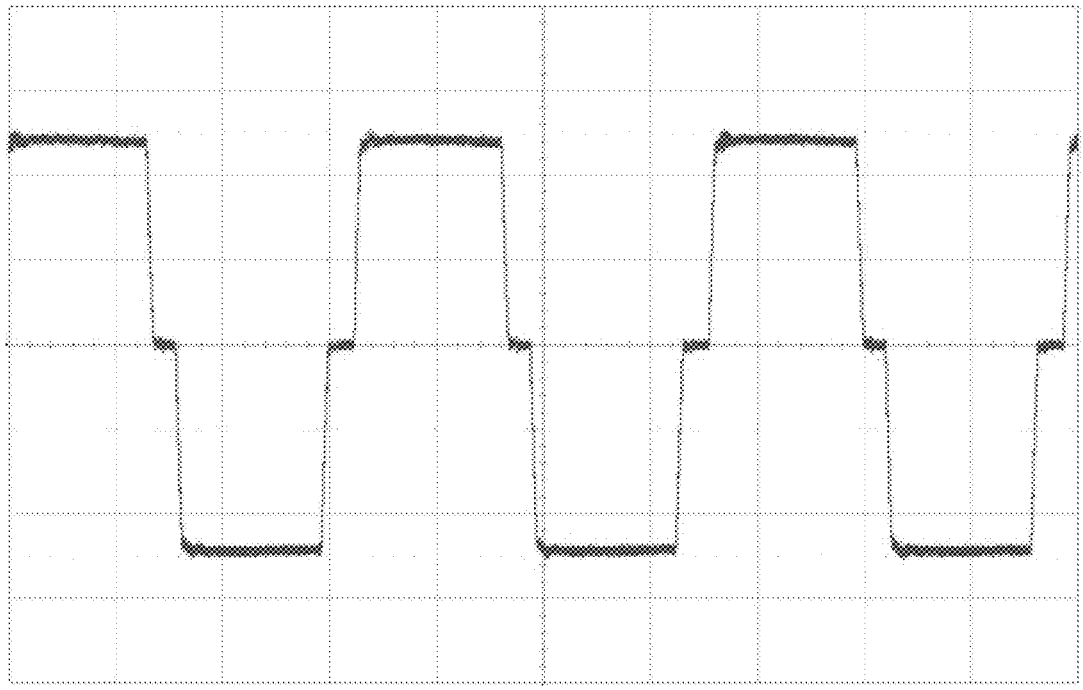
FIG. 9A and FIG. 9B are graphical representations showing the full-bridge output voltage at 5%-load for the present invention and the conventional control system, respectively.
Figure 9B:
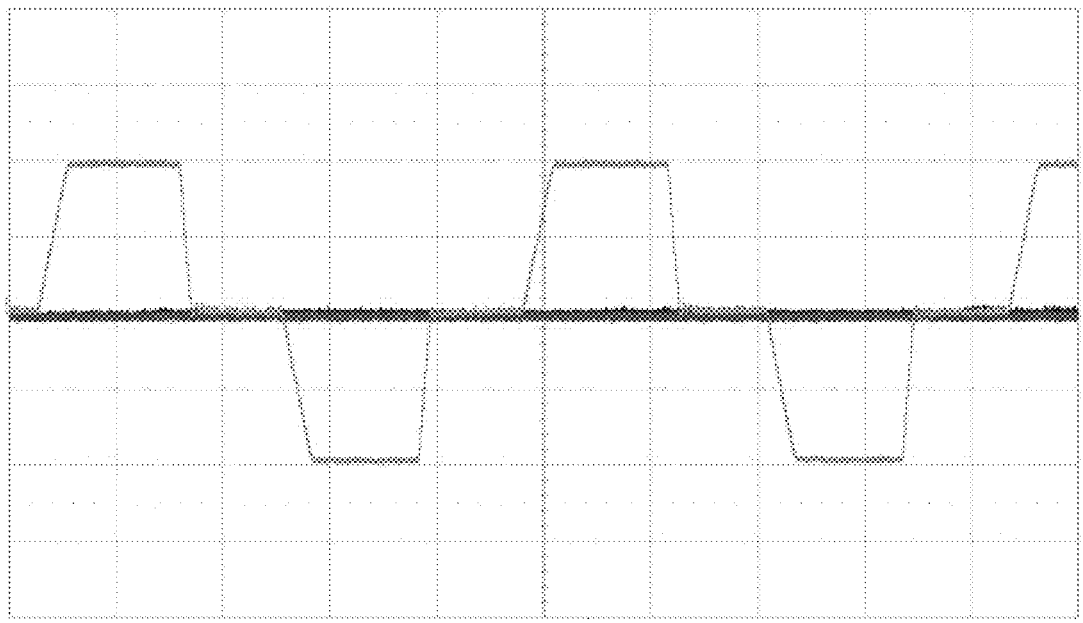

FIGS. 9A and 9B show the output voltage of the full-bridge inverter for 50%-load for the present invention and the conventional approach respectively.

Figure 10A:
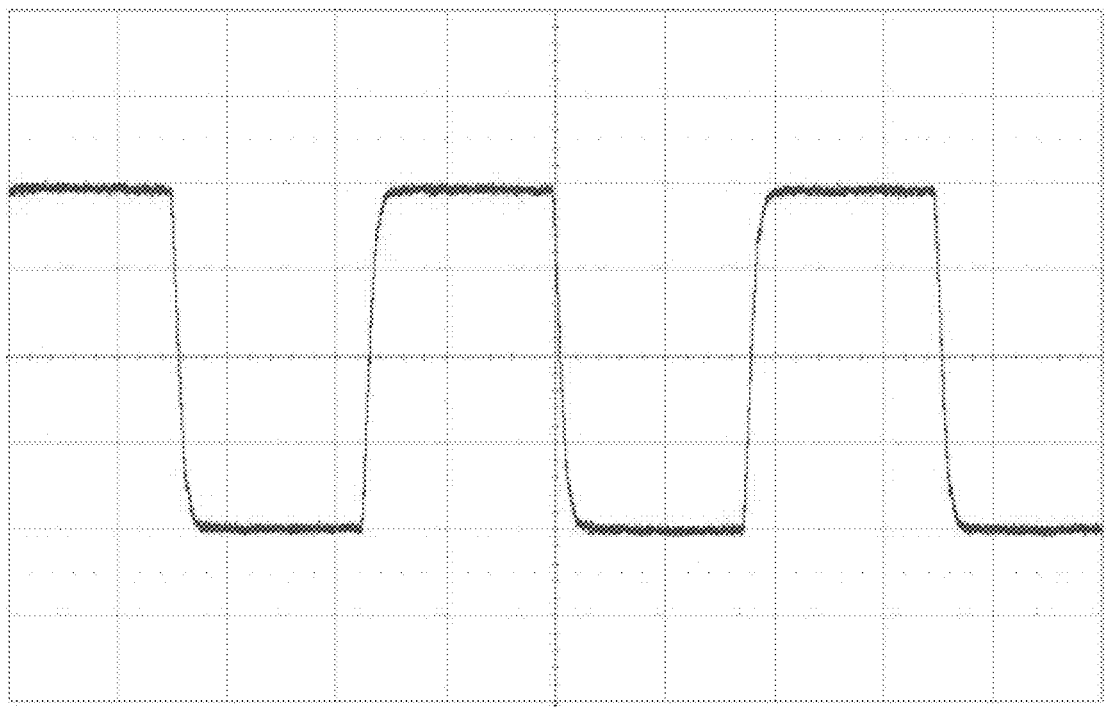
FIG. 10A and FIG. 10B are graphical representations showing the full-bridge output voltage at full-load for the present invention and the conventional control system, respectively.
Figure 10B:
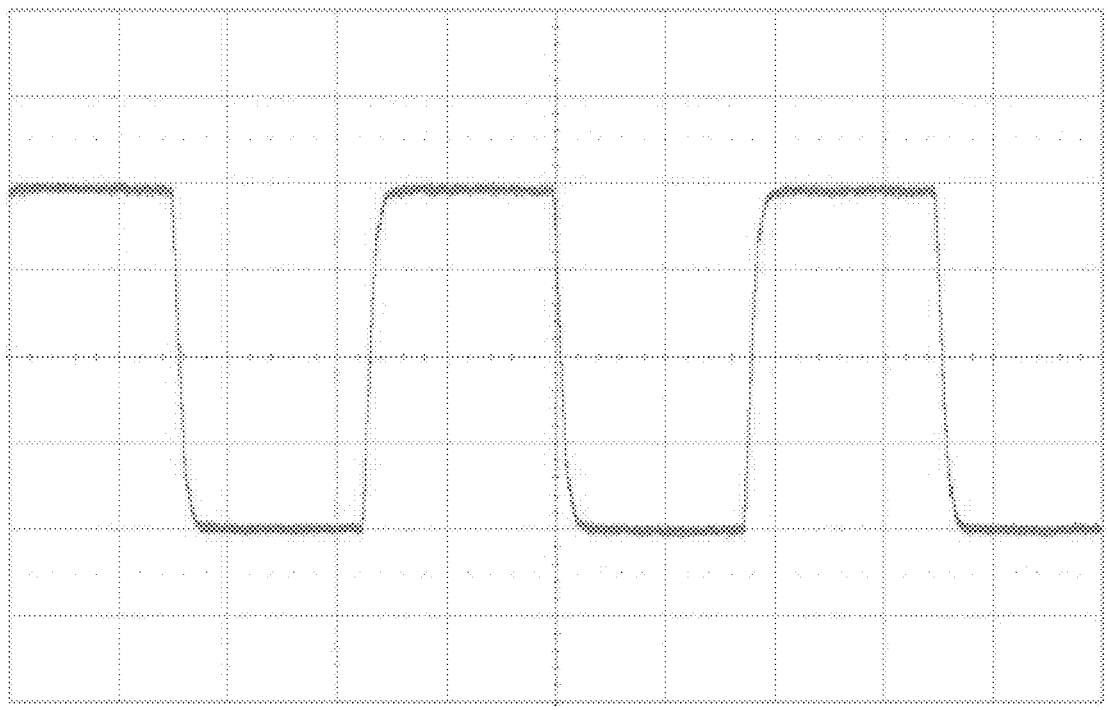

FIGS. 10A and 10B show the output voltage of the full-bridge inverter for full-load for the present invention and the conventional approach, respectively. According to these figures the output voltage of the PFC is regulated to a constant value, which in turn reduces the duty cycle to very small values for light loads. This leads to increased reactive current circulations in the full bridge converter.

Figure 11A:
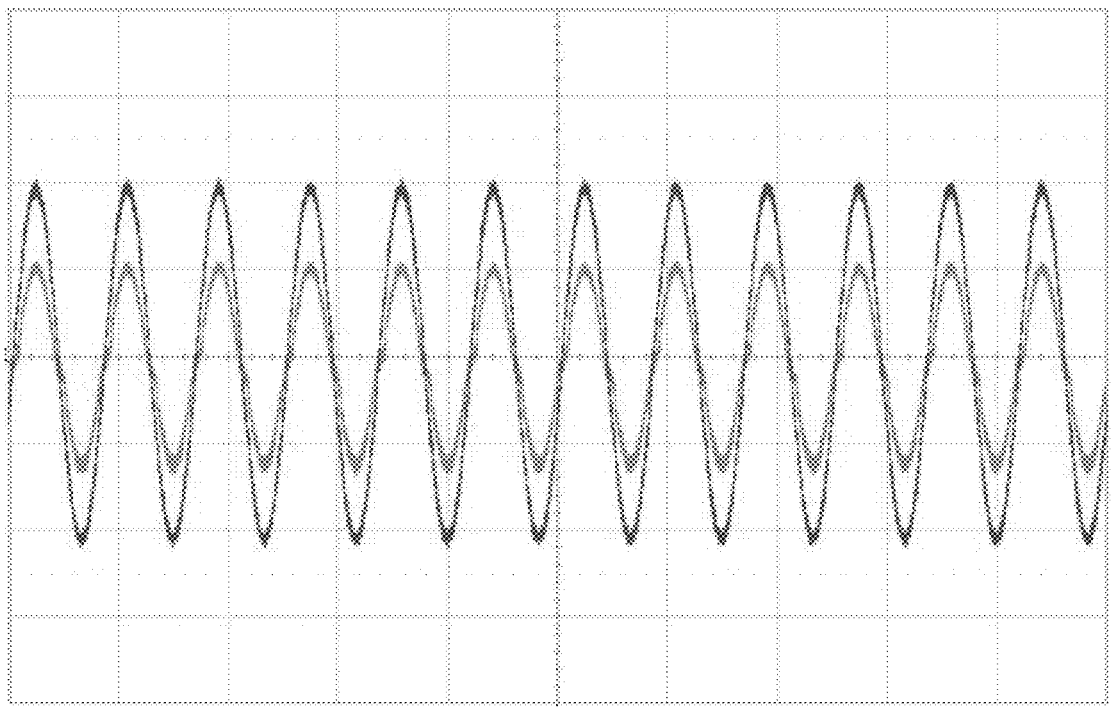
FIG. 11A, FIG. 11B, and FIG. 11C are graphical representations showing the input current and input voltage of the converter at 10%-load, 50% load and full-load, respectively.
Figure 11B:
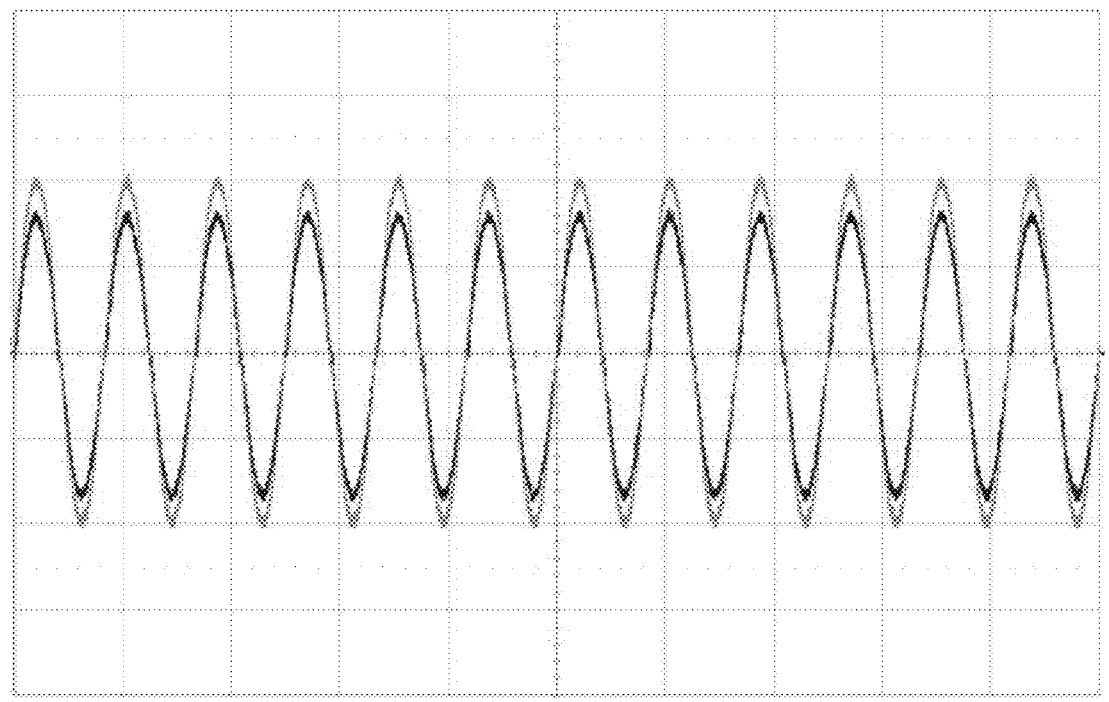
Figure 11C:
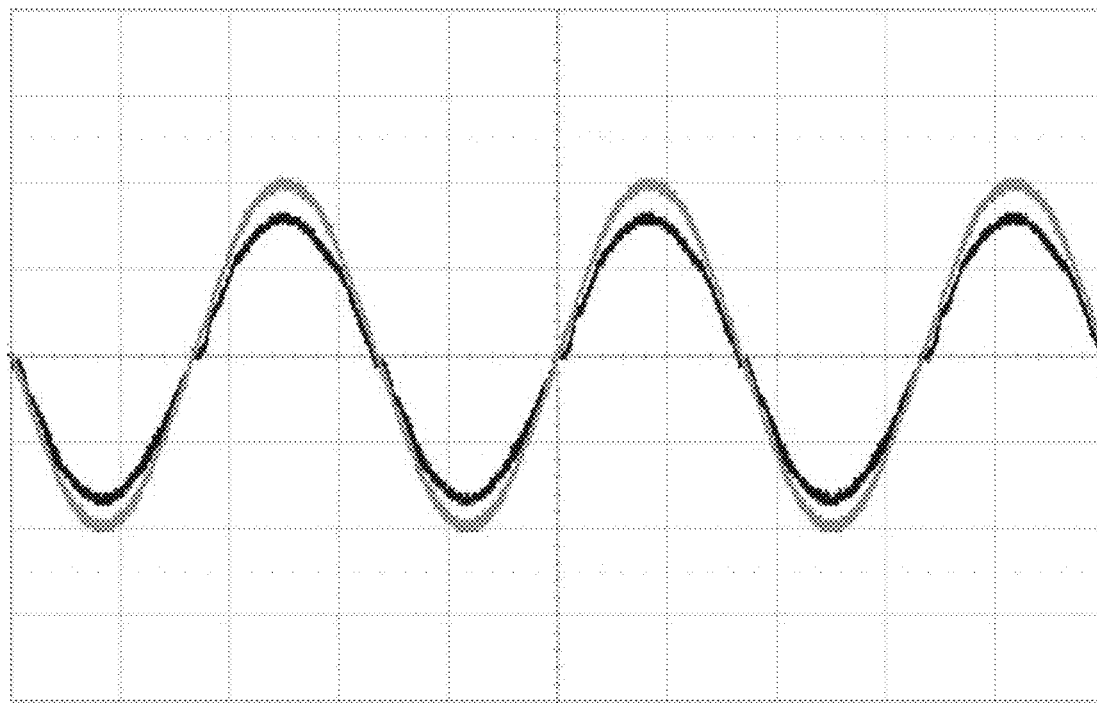

FIGS. 11A, 11B, and 11C show the input voltage and the input current of the present invention for 10%, 50% and, 100% load respectively.

In order to compare the transient response of the present invention with respect to the conventional control system, a step load change is applied to both systems.

Figure 12A:
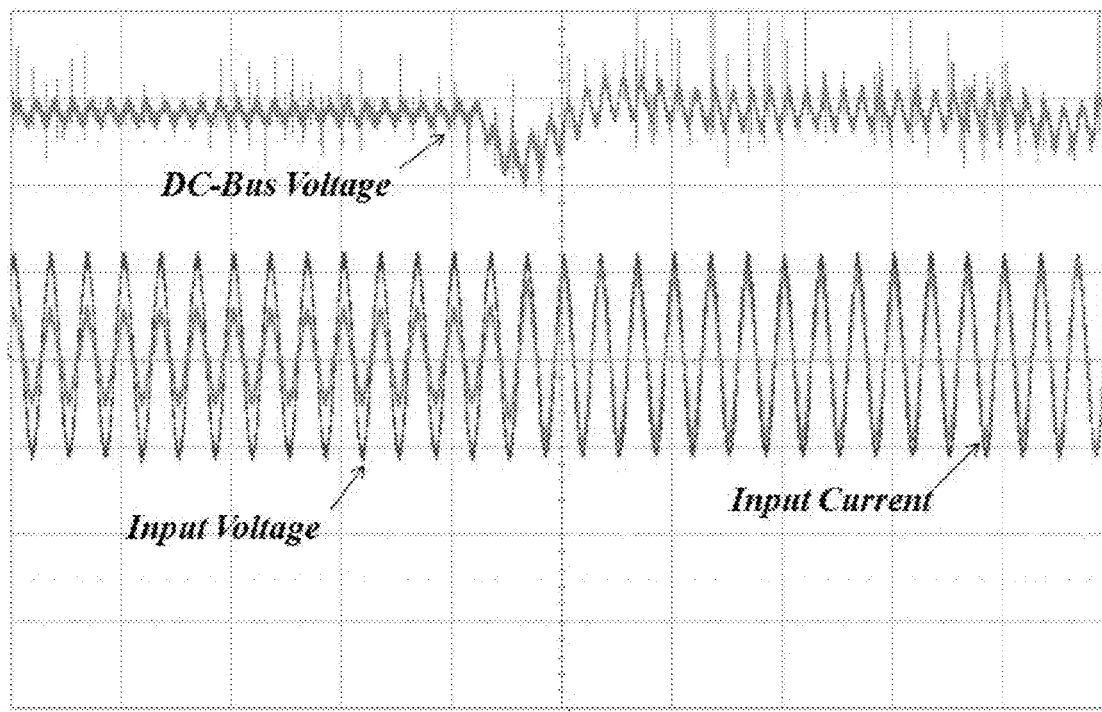
FIG. 12A and FIG. 12B are graphical representations showing the transient response of the present invention and the conventional control system for the positive step change in the load, respectively.
Figure 12B:
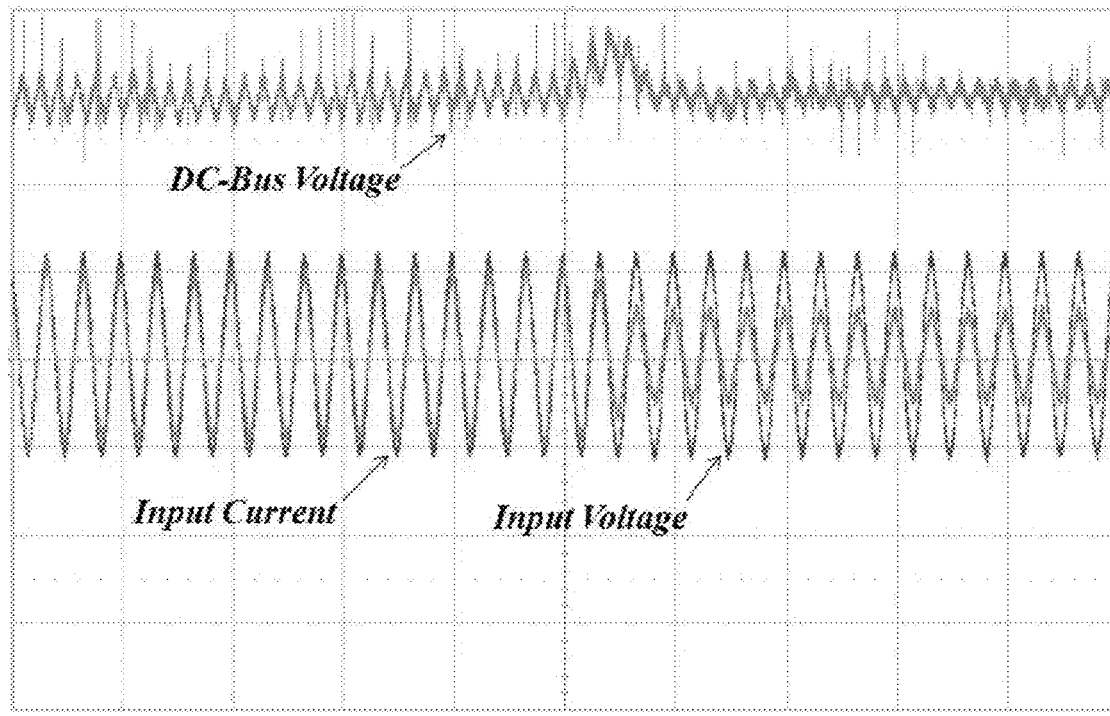

FIGS. 12A and 12B show the transient response of the present invention and the conventional control approach for a positive step load change respectively.

Figure 13A:
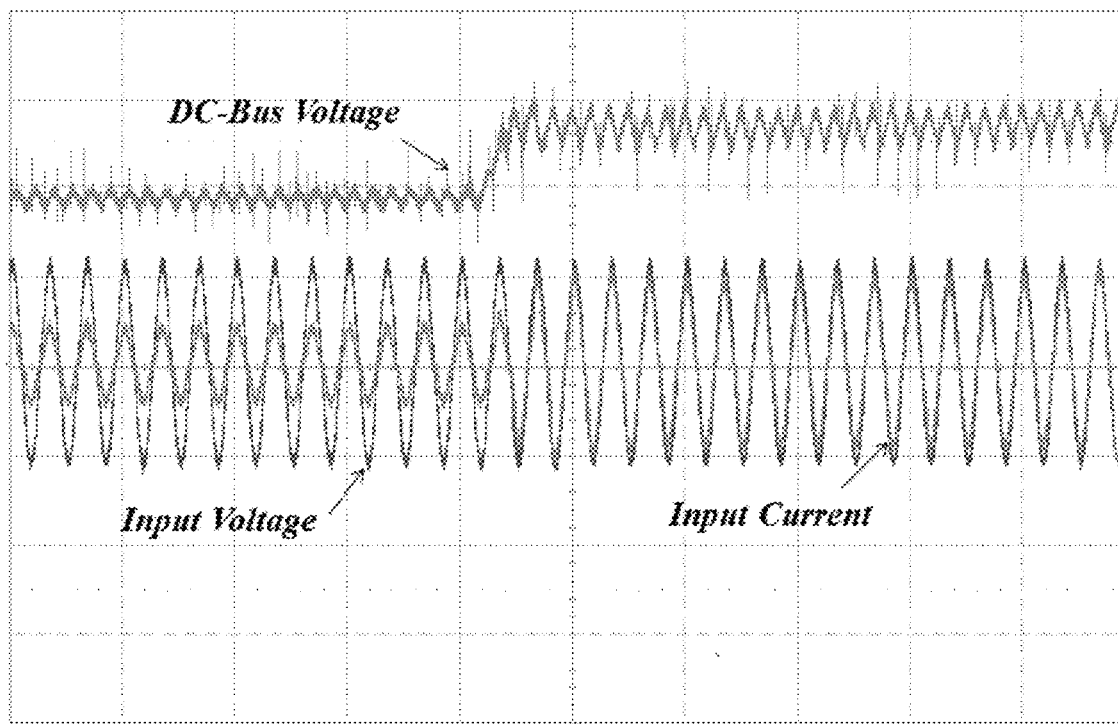
FIG. 13A and FIG. 13B are graphical representations showing the transient response of the present invention and the conventional control method for the negative step change in the load, respectively.
Figure 13B:
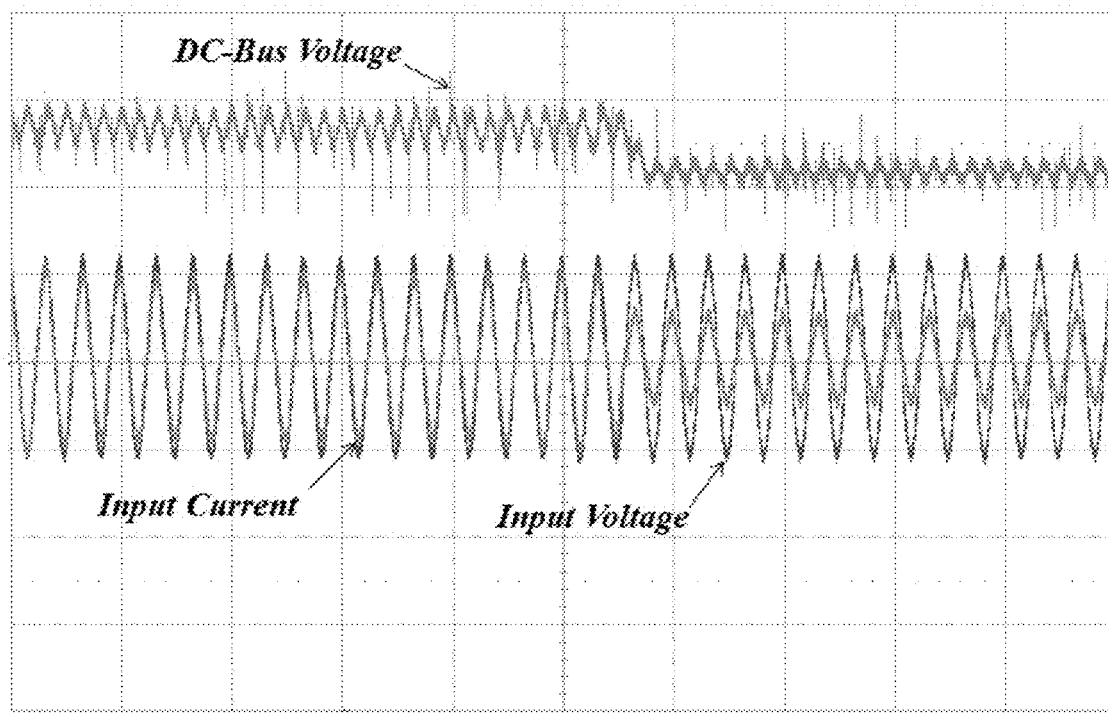

FIGS. 13A and 13B show the transient response of the present invention and the conventional control approach for a negative step load change respectively. According to these figures, the closed loop system is very slow for the conventional control system due mainly to the very low bandwidth voltage controller. Meanwhile the input current controller of the present invention is fast against the step load change. In addition, the closed-loop system with the conventional controller is not only very slow but also it causes large undershoots and overshoots, which may damage the semiconductors. The input power controller of the present invention shows a very smooth and fast response against severe load changes.

Figure 14:
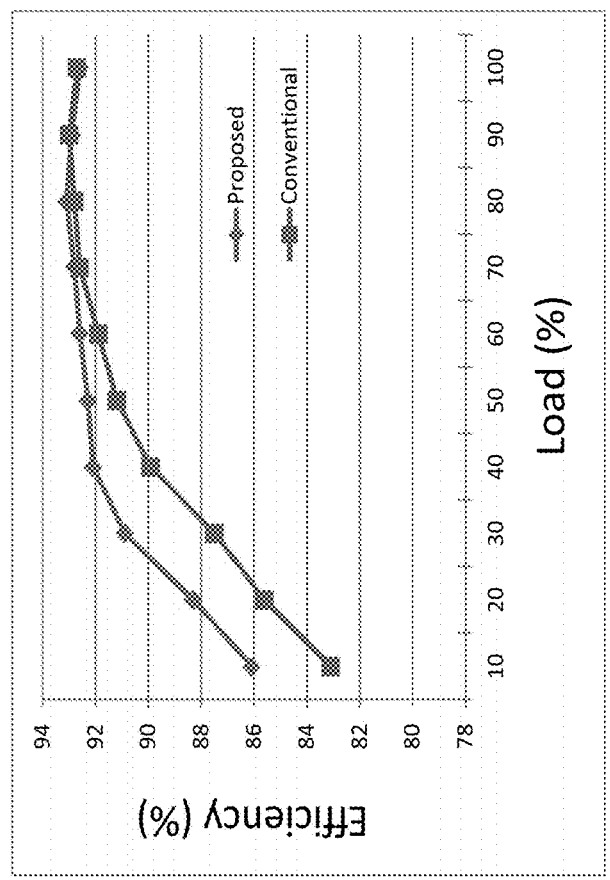
FIG. 14 is a graphical representation showing the comparison between the efficiency of the present invention and the converter with the conventional control approach.

FIG. 14 illustrates a comparison between the efficiency of the converter with the conventional control method and the control method of the present invention. FIG. 14 shows that the efficiency of the proposed converter is comparable at heavy loads. However the efficiency of the converter with the proposed control system is higher for light loads by about 4% over the conventional control method. Considering the fact that the battery charger has to operate with light loads for most of the time, this is a significant improvement in efficiency of the overall system.

The improvement in low load efficiency is due to the fact that the controller of the present invention adjusts the DC-bus voltage according to the load demand. In this way, the control circuit minimizes the reactive current circulation in the full-bridge converter. In the conventional control approach, the DC-bus voltage is regulated to be a constant value, no matter how much the load demand is. Therefore, there is too much circulating current in the full-bridge circuit at lighter loads which significantly deteriorates the system efficiency at light loads.

A person understanding this invention may now conceive of alternative structures and embodiments or variations of the above all of which are intended to fall within the scope of the invention as defined in the claims that follow.

What is claimed is:

1. A system for charging a battery comprising:
   a full bridge diode rectifier receiving an alternating current (AC) input;
   a full bridge converter;
   a pair of interleaved boost converters operatively coupled in parallel between the full bridge diode rectifier and the full bridge converter; and
   a controller for regulating an input power to said system based on power demand, said input power being regulated by adjusting an instantaneous duty ratio to ensure that said input power tracks a reference value for instantaneous power, said reference value for instantaneous power being derived from a reference value of an average power from a charging profile of said battery, said reference value for instantaneous power being based on a peak value of a rectified input voltage;
   wherein
   said pair of interleaved boost converters and said full bridge converter are adaptively operated by said controller based on said charging profile of said battery and a required amount of power; and
   said instantaneous duty ratio is given by:

$$u = \frac{L}{2v_{BUS} \cdot v_{in}} \cdot \left[ \dot{y}_d - \left( \frac{\dot{v}_{in}}{2v_{in}} - \frac{R_L}{L} \right) \cdot y - \frac{2v_{in}^2}{L} + \frac{2}{L} \cdot v_{in} \cdot v_{BUS} + k_1 \cdot e_2 + e_1 \right]$$

where
$V_{BUS}$ is an intermediate DC-bus voltage;
$v_{in}$ is an instantaneous input voltage
$R_L$ is an equivalent resistance of an inductance in said boost converter;
L is an inductance value of each boost inductor in said interleaved boost converter;
$e_1$ and $e_2$ are tracking variables; and
$k_1$ is a variable which determines a seed of convergence for tracking error.

2. The system as in claim 1, wherein the battery is operatively coupled to the full bridge converter.

3. The system as in claim 1, wherein each of the pair of interleaved boost converters comprises an inductor, a diode, and a power transistor.

4. The system as in claim 1, wherein the full bridge converter comprises a first leg and a second leg of circuit elements.

5. The system as in claim 4, wherein each leg comprises a first power transistor, a second power transistor, a first capacitor and a second capacitor, wherein the first capacitor and the second capacitor are in series, and a first terminal of a first inductor is coupled between the first capacitor and the second capacitor and a second terminal of the first inductor is coupled to an output node.

6. The system as in claim 5, wherein the power transistors are metal-oxide semiconductor field-effect transistors (MOSFETs) and wherein the MOSFETS are operatively coupled to the output node of its respective leg.

7. The system as in claim 5, wherein gate signals for the power transistors in the full bridge converter are generated based on the battery charging profile.

8. The system as in claim 1, wherein the system is an electric vehicle power conversion system.

9. An alternating current/direct current (AC/DC) converter for charging a battery comprising:
   a full bridge diode rectifier receiving an AC input;
   a full bridge converter;
   a pair of interleaved boost converters operatively coupled in parallel between the full bridge diode rectifier and the full bridge converter; and
   a controller for regulating an input power to said system based on power demand, said input power being regulated by adjusting an instantaneous duty ratio to ensure that said input power tracks a reference value for instantaneous power, said reference value for instantaneous power being derived from a reference value of an average power from a charging profile of said battery, said reference value for instantaneous power being based on a peak value of a rectified input voltage;
   wherein
   said pair of interleaved boost converters and said full bridge converter are adaptively operated by said controller based on said charging profile of said battery and a required amount of power;
   said instantaneous duty ratio is given by:

$$u = \frac{L}{2v_{BUS} \cdot v_{in}} \cdot \left[ \dot{y}_d - \left( \frac{\dot{v}_{in}}{2v_{in}} - \frac{R_L}{L} \right) \cdot y - \frac{2v_{in}^2}{L} + \frac{2}{L} \cdot v_{in} \cdot v_{BUS} + k_1 \cdot e_2 + e_1 \right]$$

where $V_{BUS}$ is an intermediate DC-bus voltage;

$v_{in}$ is an instantaneous input voltage $R_L$ is an equivalent resistance of an inductance in said boost converter;

L is an inductance value of each boost inductor in said interleaved boost converter;

$e_1$ and $e_2$ are tracking variables; and $k_1$ is a variable which determines a seed of convergence for tracking error.

10. The AC/DC converter as in claim 9, wherein the battery is operatively coupled to the full bridge converter.

11. The system as in claim 9, wherein each of the pair of interleaved boost converters comprises an inductor, a diode, and a power transistor.

12. The system as in claim 9, wherein the full bridge converter comprises a first leg and a second leg of circuit elements.

13. The system as in claim 12, wherein each leg comprises a first power transistor, a second power transistor, a first capacitor and a second capacitor, wherein the first capacitor and the second capacitor are in series, and a first terminal of a first inductor is coupled between the first capacitor and the second capacitor and a second terminal of the first inductor is coupled to an output node.

14. The system as in claim 13, wherein the power transistors are metal-oxide semiconductor field-effect transistors (MOSFETs) and wherein the MOSFETS are operatively coupled to the output node of its respective leg.

15. The system as in claim 13, wherein gate signals for the power transistors in the full bridge converter are generated based on the battery charging profile.

16. A method of charging a battery comprising steps of:
(a) receiving an alternating current (AC) input at a full bridge diode rectifier;
(b) outputting a direct current to a pair of interleaved boost converters that is operatively coupled to a full bridge converter; and
(c) operating the pair of interleaved boost converters and the full bridge converter according to a charging profile of the battery; and
(d) adjusting, by way of a controller, an instantaneous duty ratio to ensure that an input power tracks a reference value for instantaneous power, said reference value for instantaneous power being derived from a reference value of an average power from said charging profile of said battery and said reference value for instantaneous power being based on a peak value of a rectified input voltage;

wherein said pair of interleaved boost converters and said full bridge converter are adaptively operated by said controller based on said charging profile of said battery and a required amount of power;

said instantaneous duty ratio is given by:

$$u = \frac{L}{2v_{BUS} \cdot v_{in}} \cdot \left[ \dot{y}_d - \left( \frac{\dot{v}_{in}}{2v_{in}} - \frac{R_L}{L} \right) \cdot y - \frac{2v_{in}^2}{L} + \frac{2}{L} \cdot v_{in} \cdot v_{BUS} + k_1 \cdot e_2 + e_1 \right]$$

where $V_{BUS}$ is an intermediate DC-bus voltage;

$v_{in}$ is an instantaneous input voltage $R_L$ is an equivalent resistance of an inductance in said boost converter;

L is an inductance value of each boost inductor in said interleaved boost converter;

$e_1$ and $e_2$ are tracking variables; and k is a variable which determines a seed of convergence for tracking error.

17. The method as in claim 16, wherein step (c) further includes the step of generating gate signals for power transistors in the full bridge converter based on the battery charging profile.

* * * * *